US008094424B2

(12) United States Patent
Cornelius et al.

(10) Patent No.: US 8,094,424 B2
(45) Date of Patent: Jan. 10, 2012

(54) OPERATION DETECTION DEVICES HAVING A SENSOR POSITIONED TO DETECT A TRANSITION EVENT FROM AN OVERCURRENT PROTECTION COMPONENT AND RELATED METHODS

(75) Inventors: Jonathan Conrad Cornelius, Lillington, NC (US); Sherif I. Kamel, Cary, NC (US)

(73) Assignee: Tyco Electronics Corporation, Middletown, PA (US)

( * ) Notice: Subject to any disclaimer, the term of this patent is extended or adjusted under 35 U.S.C. 154(b) by 795 days.

(21) Appl. No.: 12/137,154

(22) Filed: Jun. 11, 2008

(65) Prior Publication Data

US 2009/0213505 A1 Aug. 27, 2009

Related U.S. Application Data

(60) Provisional application No. 61/031,513, filed on Feb. 26, 2008.

(51) Int. Cl.
*H02H 7/00* (2006.01)

(52) U.S. Cl. .................................................... 361/93.1

(58) Field of Classification Search .................. 361/93.1
See application file for complete search history.

(56) References Cited

U.S. PATENT DOCUMENTS 4,056,816 A * 11/1977 Guim .......................... 340/638
4,673,928 A 6/1987 Guim
4,698,621 A 10/1987 Masot
5,064,998 A * 11/1991 Holling ........................ 219/519
7,791,846 B2 * 9/2010 Roscoe et al. .................. 361/2

FOREIGN PATENT DOCUMENTS

DE 195 14 580 A1 10/1996
DE 20 2004 002 714 U1 6/2004
WO WO 00/28635 5/2000

OTHER PUBLICATIONS

International Search Report and the Written Opinion for PCT/US2009/000716, mailed on Apr. 8, 2009.

* cited by examiner

*Primary Examiner* — Stephen W Jackson

(74) *Attorney, Agent, or Firm* — Myers Bigel Sibley & Sajovec

(57) ABSTRACT

An operation detection device for an overcurrent protection component is provided. The overcurrent protection component has a closed state and an open state and outputs a transition event responsive to a transition between the closed state and the open state. The operation detection device includes a housing configured to attach to the overcurrent protection component. A sensor is positioned in the housing at a location selected to allow the sensor to detect the transition event. A switch circuit is operatively coupled to the sensor and is configured to generate an output signal indicating a change in state of the overcurrent protection component responsive to detection of the transition event by the sensor.

28 Claims, 5 Drawing Sheets

OPERATION DETECTION DEVICES HAVING A SENSOR POSITIONED TO DETECT A TRANSITION EVENT FROM AN OVERCURRENT PROTECTION COMPONENT AND RELATED METHODS

RELATED APPLICATIONS

This application claims priority to U.S. Provisional Application Ser. No. 61/031,513 filed Feb. 26, 2008, the disclosure of which is hereby incorporated by reference in its entirety.

FIELD OF THE INVENTION

The present invention relates to power distribution network devices, and in particular, to operation detection devices for cable protectors or "limiters."

BACKGROUND

In power distribution networks, there are typically many cable over current protection devices, such as limiters and fuses, that limit and/or even prevent cable damage due to over-current situations that may be caused by circuit overloads, inadvertent short circuit faults and/or the like. The responsible party (such as the utility company) may benefit if they know when these limiting devices operate, e.g., to open the respective electric circuit or link.

Conventional "blown fuse indicators" typically use a small, fusible wire that is electrically connected to a larger, primary fuse element. A spring-loaded flag or other indicia is held in a closed position by the fusible wire. When the fuse element opens a circuit in response to an over-current and/or over-voltage condition, the fusible wire is liquefied, and, consequently, the spring-loaded flag is deployed. However, fusible wires that are electrically integrated with the fuse element and release a spring-loaded indicator may not be easily installed on existing equipment (i.e., retrofitted) and/or may present difficulties with resettability.

SUMMARY OF EMBODIMENTS OF THE INVENTION

According to some embodiments of the invention, an operation detection device for an overcurrent protection component is provided. The overcurrent protection component has a closed state and an open state and outputs a transition event responsive to a transition between the closed state and the open state. The operation detection device includes a housing configured to attach to the overcurrent protection component. A sensor is positioned in the housing at a location selected to allow the sensor to detect the transition event. A switch circuit is operatively coupled to the sensor and is configured to generate an output signal indicating a change in state of the overcurrent protection component responsive to detection of the transition event by the sensor.

In further embodiments of the invention, the sensor is electrically isolated from the overcurrent protection component.

In other embodiments, the transition event includes one of a plurality of transition events having different associated types, and the switch circuit is further configured to identify ones of the associated types of transition events responsive to detection by the sensor. The types of transition events can include a short circuit transition event and/or an overload transition event. In particular embodiments, the sensor includes a plurality of sensors, and the plurality of sensors can include optical sensors, thermal sensors and/or acoustic sensors.

In further embodiments, the transition event includes a light burst emitted by the overcurrent protection component when the overcurrent protection component transitions from the closed state to the open state and the sensor is a photosensor. The sensor can be configured to detect the transition event responsive to the light burst when the light burst has a duration of less than about 500 millisecond.

In other embodiments, the transition event includes radiofrequency (RF) energy produced by an arc from the overcurrent protection component when the overcurrent protection component transitions from the closed state to the open state. The sensor can include an RF detector.

In other embodiments, the transition event includes infrared (IR) radiation produced by heat of an arc from the overcurrent protection component when the overcurrent protection component transitions from the closed state to the open state. The sensor can include an IR detector. In other embodiments, the transition event includes an acoustic impulse produced when the overcurrent protection component transitions from the closed state to the open state. The sensor can include an acoustic detector.

In further embodiments, the switch circuit further includes a transmitter configured to transmit the output signal indicating a change in state of the overcurrent protection component to provide a remote notification of detection of the transition event.

In still further embodiments, the device includes a light emitting device (LED) coupled to the housing. The switch circuit is configured to illuminate the LED responsive to detection of the transition event by the sensor to provide a local notification of detection of the transition event.

According to further embodiments, an overcurrent protection component assembly includes the overcurrent protection component and the operation detection device.

According to some embodiments, an operation detection device for an overcurrent protection component is provided. The overcurrent protection component has a closed state and an open state and outputs a transition event responsive to a transition between the closed state and the open state. A sensor is electrically isolated from the overcurrent protection component and positioned in a location selected to allow the sensor to detect the transition event. A switch circuit is operatively coupled to the sensor and is configured to generate an output signal indicating a change in state of the overcurrent protection component responsive to detection of the transition event by the sensor.

In some embodiments, the device further includes a housing configured to detachably mount the sensor to an overcurrent protection component and to position the sensor at the location selected to allow the sensor to detect the transition event.

In further embodiments, the location of the sensor is displaced from the overcurrent protection component.

According to some embodiments, methods of detecting an operation of an overcurrent protection component are provided. The overcurrent protection component has a closed state and an open state and outputs a transition event responsive to a transition between the closed state and the open state. The transition event is detected using a sensor that is electrically isolated from the overcurrent protection component. An output signal is generated indicating a change in state of the overcurrent protection component responsive to detection of the transition event by the sensor.

DETAILED DESCRIPTION OF EMBODIMENTS OF THE INVENTION

Figure 1:
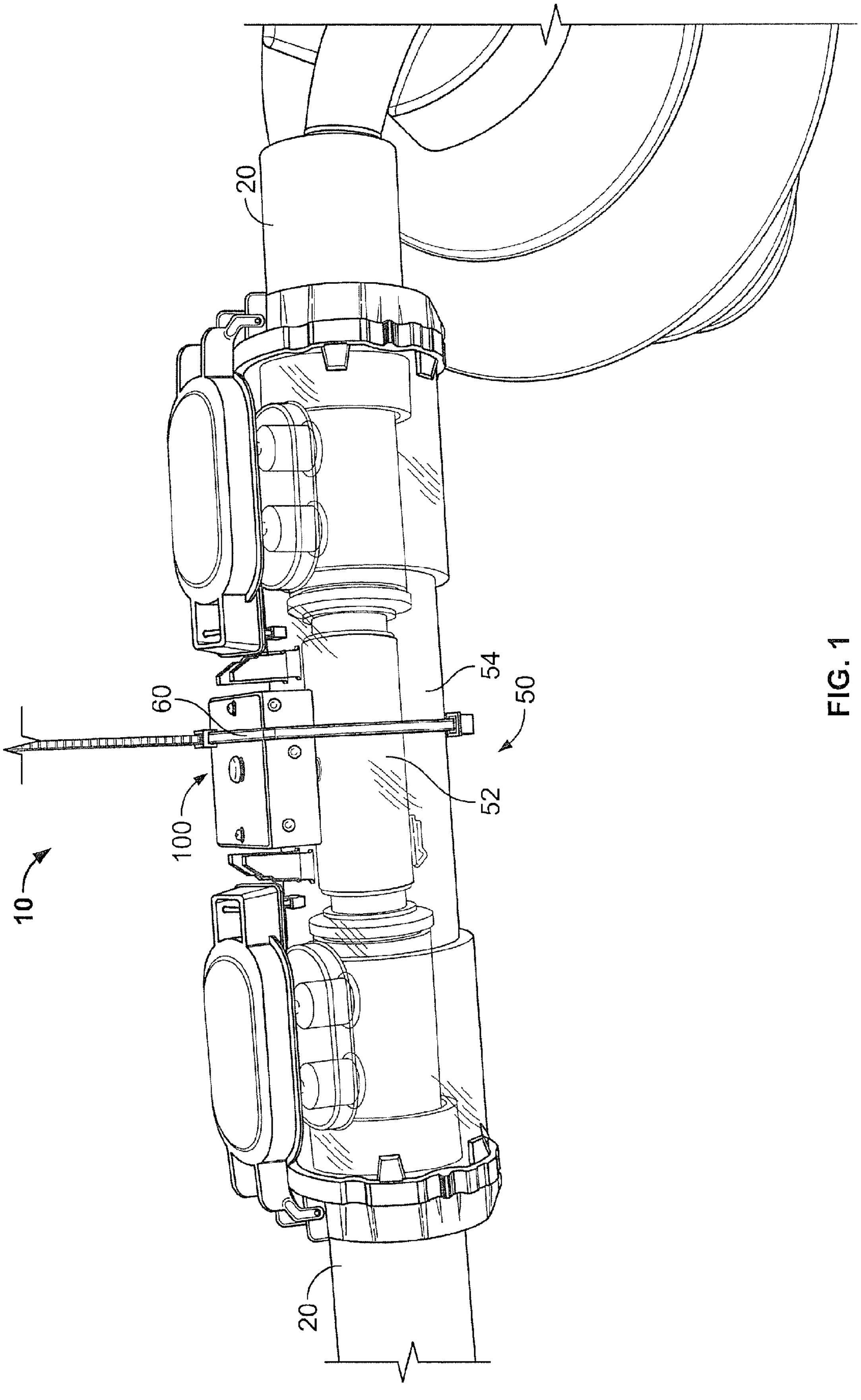
FIG. 1 is a perspective view of an overcurrent protection component assembly including an operation detection device for an overcurrent protection component according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps, e.g., illustrated in flowcharts) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

As will be appreciated by one of skill in the art, the invention may be embodied as a method, device, or computer program product. Accordingly, the present invention may take the form of an entirely hardware embodiment or an embodiment combining software and hardware aspects all generally referred to herein as a "circuit" or "module."

As illustrated in the embodiments of FIG. 1, an operation detection device/overcurrent protection component assembly 10 includes an overcurrent protection component 50, a strap or connector 60 and an operation detection device 100. Ports 20 are electrically connected within the overcurrent protection component 50 and are connected to an electric circuit (not shown) via cables. The overcurrent protection component 50 includes a fuse element 52 and a transparent housing 54. The operation detection device 100 is mounted to the overcurrent protection component 50 by a clamp or connector 60. The overcurrent protection component 50, which protects the electric circuit, has a closed state and an open state. The overcurrent protection component 50 outputs a transition event when the overcurrent protection component 50 transitions between the closed state and the open state. For example, the fuse element 52 opens or disconnects the electrical ports 20 to open the circuit in an over-current situation that may be caused by a circuit excessive overload, inadvertent short circuit fault and/or the like. When the overcurrent protection component 50 transitions between a closed state (in which the fuse element 52 connects the ports 20) and an open state (in which the fuse element 52 disconnects the ports 20), the overcurrent protection component 50 outputs a transition event, such as an electrical arc. The arc can produce an optical event, such as a light burst, thermal energy, radio frequency (RF) energy, infrared (IR) radiation, and/or acoustic impulses (sound waves).

Figure 2:
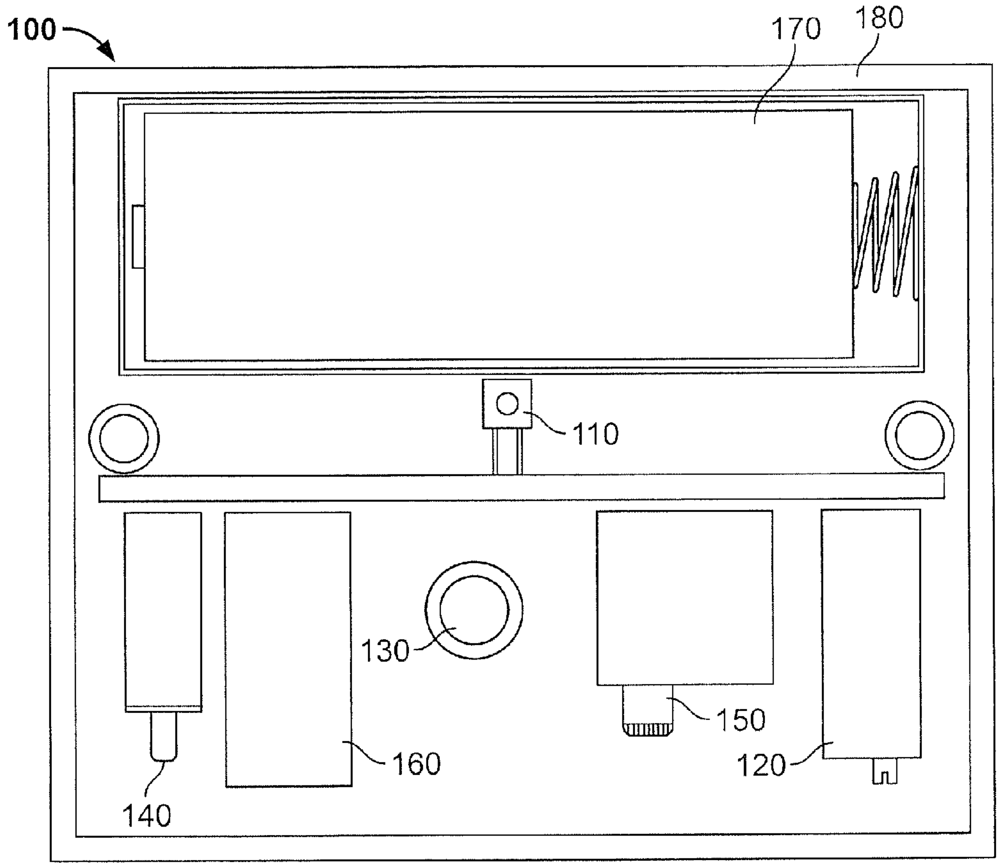
FIG. 2 is a block diagram of the operation detection device of FIG. 1.
Figure 3:
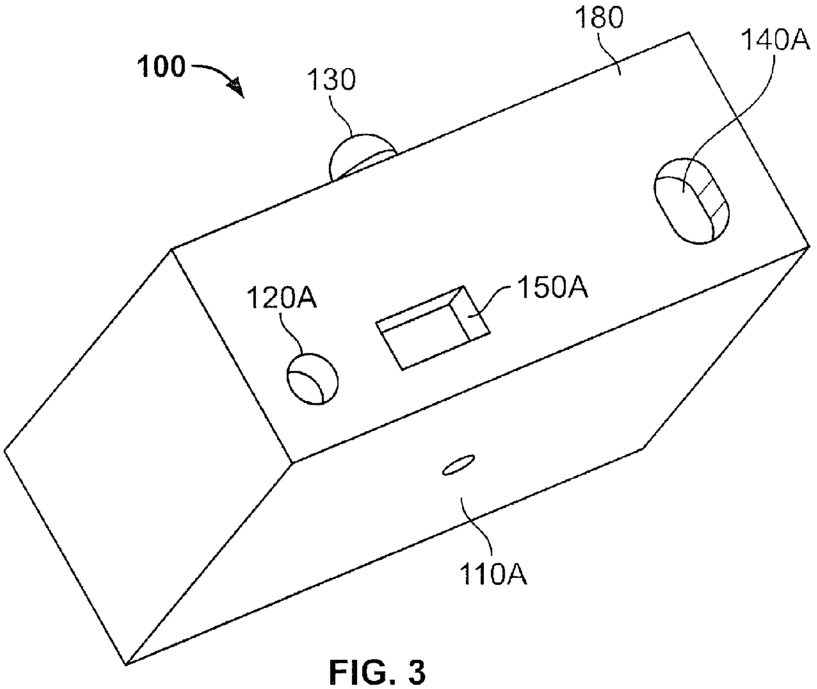
FIG. 3 is a perspective view of the operation detection device of FIG. 1.
Figure 4:
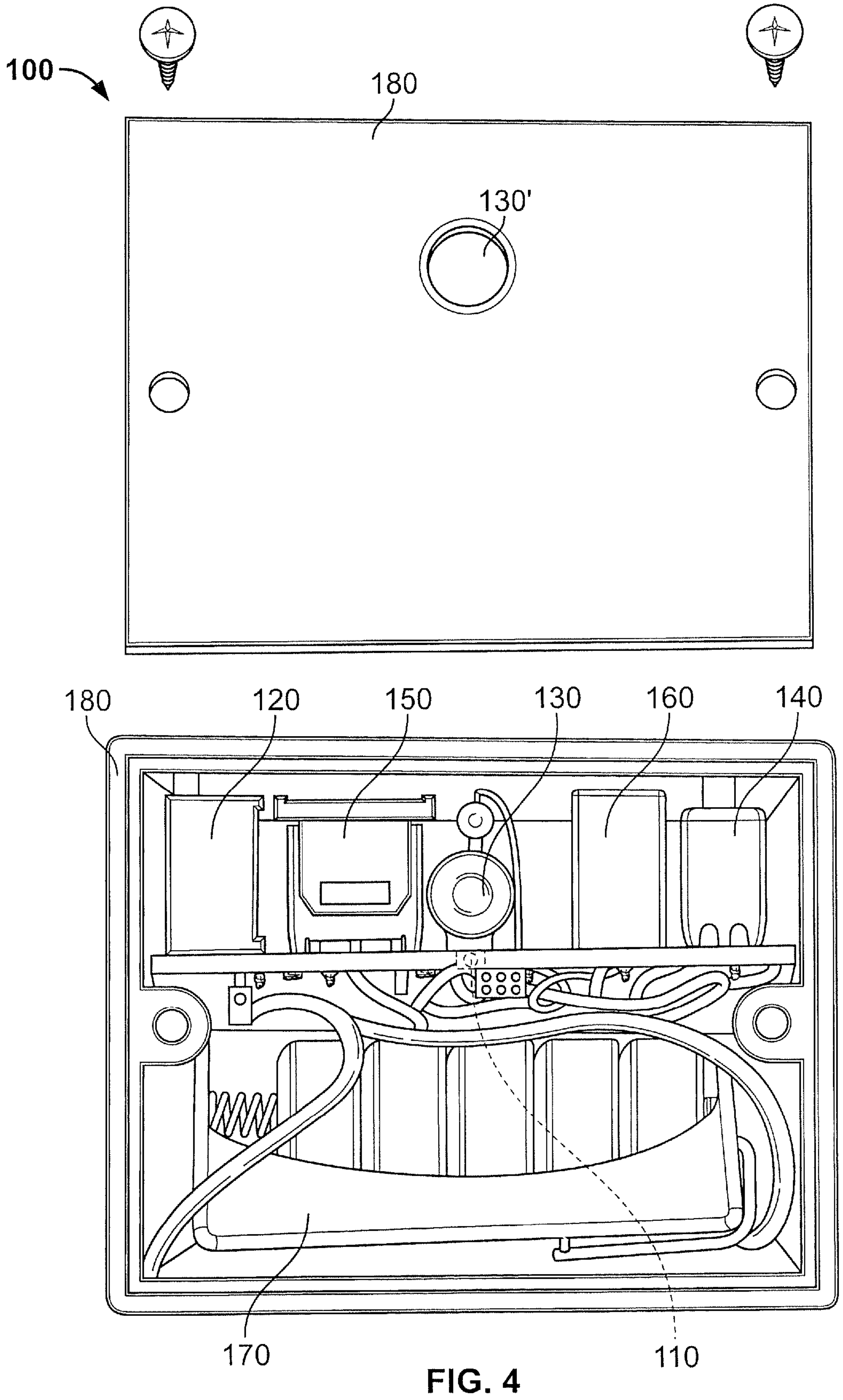
FIG. 4 is an exploded perspective view of an operation detection device according to some embodiments of the present invention and showing the components of FIG. 2.

As illustrated in FIGS. 2 and 4, the operation detection device 100 includes a sensor 110, a variable resistor 120, a light emitting diode (LED) 130, a reset button 140, an on/off button 150, a switch circuit 160, a power supply or battery 170 and a housing 180. As shown in FIG. 3, the housing 180 includes access apertures 110A, 120A, 140A and 150A for the sensor 110, the variable resistor 120, the reset button 140 and the on/off button 150, respectively. These components may be enclosed or covered to provide environmental seal of the detection device.

Figure 7:
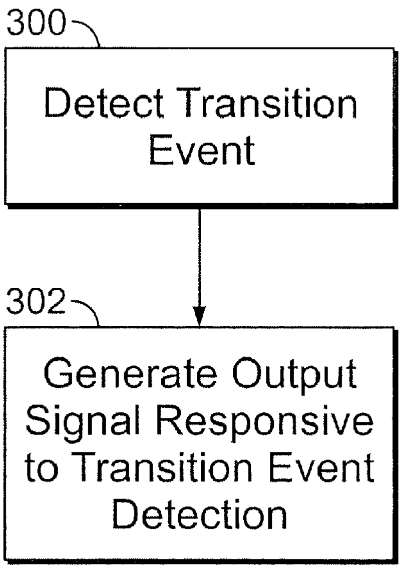
FIG. 7 is a flowchart illustrating operations for detecting the operation of an overcurrent protection component according to some embodiments of the present invention.

As shown in FIGS. 1-4, the housing 180 is configured to position the sensor 110 adjacent the transparent housing 54 of the overcurrent protection component 50. The location of the sensor 110 can be selected so that the sensor 110 detects the transition event when the overcurrent protection component 50 transitions between a closed and an open state (Block 300, FIG. 7). The switch circuit 160 is operatively connected to the sensor 110 and generates an output signal indicating a change in state of the overcurrent protection component overcurrent protection component 50 responsive to detection of the transition event by the sensor 110 (Block 302, FIG. 7).

In some embodiments, the sensor 110 can be configured to detect one or more indicia of the electrical arc transition event, including optical indicia, heat, infrared (IR) radiation, radiofrequency (RF) radiation, acoustic energy (such as sound waves) and the like. In particular embodiments and as shown in FIGS. 1-4, the sensor 110 is electrically isolated and/or physically displaced from the overcurrent protection component 50. Accordingly, electrical integration of the sensor 110 with the fuse element 52 is not provided in some embodiments of the present invention.

For example, the transparent housing 54 can transmit a flash of light from an electrical arc transition event in the fuse element 52, and the sensor 110 can be a photosensor. In some embodiments, the housing 54 may be opaque, and/or the transition event can be detected without requiring an optical sensor, e.g., by using a heat sensor, IR sensor, RF sensor and/or acoustic sensor.

Accordingly, the switch circuit 160 of the operation detection device 100 can generate an output signal indicating a change in state of the overcurrent protection component 50 responsive to detection of the transition event by the sensor 110 when the fuse element 52 opens a circuit. For example, the sensor 110 can be electrically isolated and/or physically displaced from the fuse element 52 before and after the fuse element 52 outputs a transition event that opens a circuit due to an over-current condition. In the configuration illustrated in FIGS. 1-4, the housing 180 of the operation detection device 100 can be removably attached to existing overcurrent protection/limiter equipment without requiring electrical integration with the fuse element 52. In some embodiments, the reset button 140 can reset the switch circuit 160 for additional usage.

Figure 5:
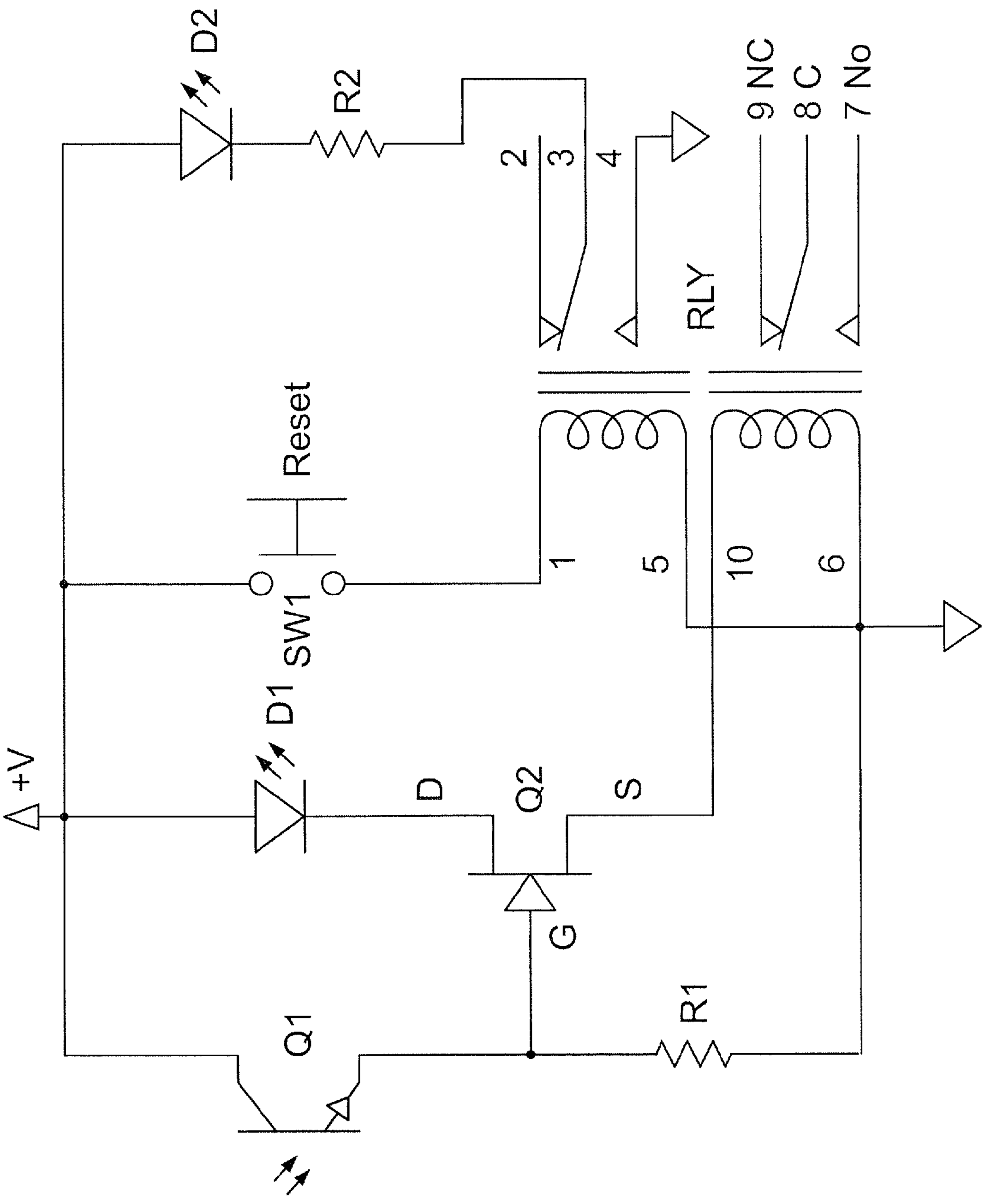
FIG. 5 is a circuit diagram of an operation detection device according to some embodiments of the present invention.

For example, as illustrated in FIG. 5, the sensor 110 may include a phototransistor Q1 and the switch circuit 160 may include a latching relay RLY. It will be understood that optical sensors are not limited to the illustrated phototransistor Q1. For example, a photodiode can be used. The phototransistor Q1 is configured to detect and activate ("trigger") by generating an output signal responsive to a flash of light that is emitted from the fuse element 52 (FIG. 1) when the fuse element 52 opens a circuit (breaks the connection between the ports 20) to protect the circuit from an over-current condition.

The phototransistor Q1 can have a response time sufficient to detect sub-millisecond light bursts. The activation of the phototransistor Q1 can be used to switch a semiconductor device field effect transistor (FET) Q2, which switches the state of the latching relay RLY. A relay contact signal (output signal) from the latching relay RLY can be used to control local and/or remote notification of the status of the operation control device 100. For example, the latching relay RLY can trigger illumination of the diode D2 (corresponding to the LED 130 of FIGS. 1-4) to provide a local notification signal indicating that the overcurrent protection component 50 is in the open state. In particular embodiments, the use of a blinking LED or LED circuit can reduce power consumption and/or increase the battery life of the battery 170. In some embodiments, the latching relay RLY can trigger a remote notification of the status of the overcurrent protection component 50, for example, by triggering a transmitter to transmit a signal to a remote device.

The latching relay RLY can remain in the "triggered" state until, for example, the latching relay RLY is reset by an operator by pressing the reset switch 140 of FIG. 2 (which corresponds to the reset switch component SW1 of FIG. 4). The reset switch 140 can be a magnetic reed or the like to support environmental sealing of the detection device 100. In some embodiments, an additional LED D1 can be used for testing and/or adjusting the detection device 100.

In particular embodiments as shown in FIGS. 2, 4 and 5, the sensitivity and/or false triggering of the device 100 can be controlled by the variable resistor 120 (corresponding to resistor R1 in FIG. 5) and/or a potentiometer. However, in some embodiments, a fixed value resistor can be used. In various embodiments, the selection of the circuit design and component selection for the circuit, e.g., the circuit shown in FIG. 5, may result in a longer battery life, re-settable operation, and reduced maintenance such that the device 100 may be substantially maintenance free.

As illustrated in FIG. 1, the operation detection device 100 is mounted on the light transmissive housing 54 of the overcurrent protection component 50 so as to position the sensor 110 (which is located at the opening 110A of FIG. 3) in a location to detect transition events, such as over the fusible element 52. For example, the overcurrent protection component 50 can be a Tyco Electronics Smart Limiter cable protector. In some embodiments, the sensitivity and/or false triggering of the device 100 can be controlled by physical light blockage by the housing 180. As illustrated, the device 100 can be mounted on the overcurrent protection component 50 by a strap connector 60; however, the device 100 can be mounted using various techniques, including a snap fit connection, separable or integrated clamps or the like.

Although embodiments of the current invention are illustrated with respect to the operation detection device 100 and the overcurrent protection component 50, it should be understood that various modifications to the illustrated embodiments of the operation detection device 100 and the overcurrent protection component 50 may also be provided in some embodiments of the present invention. For example, although the operation detection device 100 is illustrated as a separate device that is detachably mounted to the overcurrent protection component 50, it should be understood that the operation detection device 100 can be integrated with and provided in a single housing with the overcurrent protection component 50 in some embodiments. The operation detection device 100 illustrated in FIG. 2 includes a power supply or battery 170; however, it should be understood that the power supply can be provided by an external source, such as from another local circuit or the overcurrent protection component 50 itself.

Although embodiments according to the present invention are described with respect to the photosensor 110 being a phototransistor Q1 in FIGS. 2-5, it should be understood that other types of optical and non-optical sensors can be used. In some embodiments, the housing 54 of the overcurrent protection component 50 is opaque, and/or the operation detection device 100 can detect a transition event without requiring photon/optical detection. For example, the detection of a transition event from the overcurrent protection component 50 can be through the detection of radiofrequency (RF) (such as broadband radiofrequency (RF)) energy produced by an arc generated by triggering of the fuse element 52. In other embodiments, light reception and/or infrared (IR) (such as band filtered infrared (IR)) radiation due to the heat of the arc may be used for detecting the transition event. Further approaches include, for example, a time weighted change (e.g., integrator based) in the current flow through the overcurrent protection component 50 to detect sudden changes terminating at zero current flow and/or acoustic impulses (e.g., sound waves), such as acoustic impulses detected from the housing 54 of the overcurrent protection component 50. It will also be understood that a combination of these varied detection approaches may be used in some embodiments of the present invention. Accordingly, RF detectors, IR detectors, and/or acoustic detectors (such as microphones) may be used to detect a transition event from the overcurrent protection component 50.

Although the sensor 110 is illustrated as being positioned adjacent the overcurrent protection component 50 by an aperture 110A, it should be understood that any suitable configuration can be used. If the sensor 110 is an optical sensor, any configuration suitable for the sensor 110 to detect light may be used. For example, the sensor 110 can be positioned inside the housing 54 and light can be transmitted to the sensor 110 via an optical fiber or other suitable light transmitter.

Figure 6:
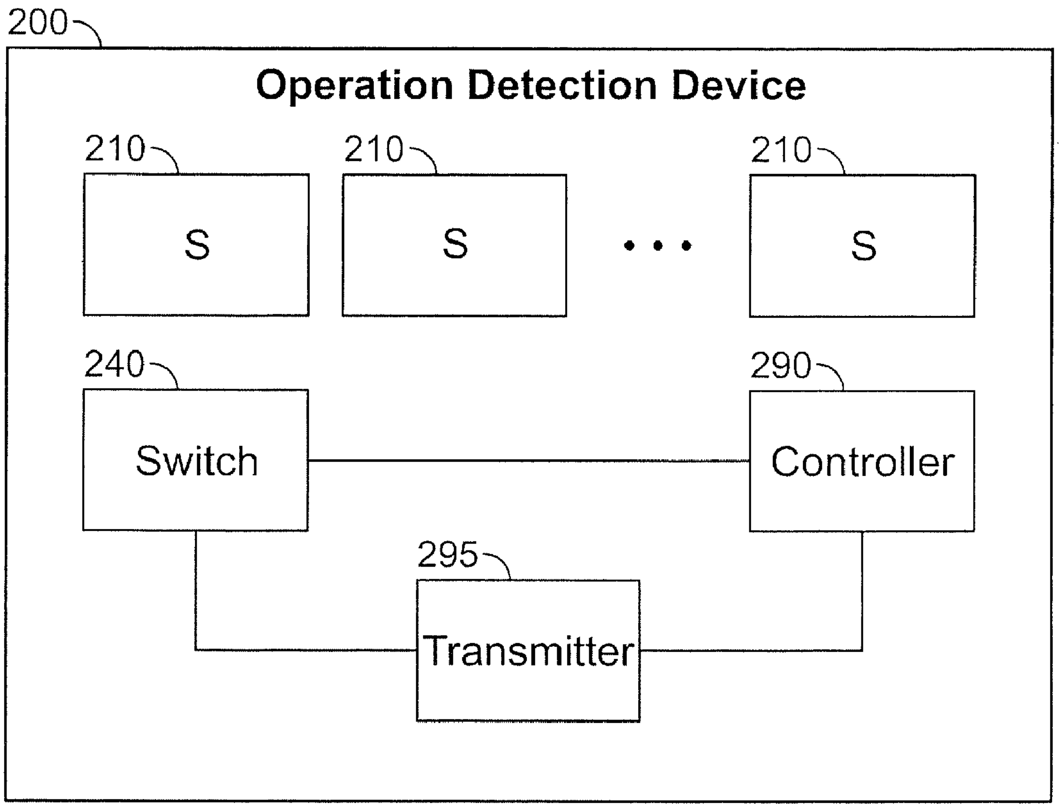
FIG. 6 is a block diagram of an operation detection device according to some embodiments of the present invention.

For example, as shown in FIG. 6, an operation detection device 200 includes one or more sensors 210 and a switch circuit 260 having a controller 290 and a transmitter 295. The controller 290 is configured to analyze outputs from one or more of the sensors 210, e.g., to increase the reliability/certainty of detection and/or to provide additional data about the type of fault triggering operation. In some embodiments of the present invention, the transition event is one of a plurality of transition events, and the controller 290 is further configured to identify one of the plurality of transition events responsive to detection by the sensor 210. For example, the transition event signature may indicate a type or a potential cause of fault (e.g., a circuit overload or short circuit) which produces a characteristic profile, such as a time duration, photon flux and/or heat flux detected by the sensor 210 from a transition event from an overcurrent protection component (such as overload overcurrent protection component 50 in FIG. 1). For example, a short, bright arc from a fuse element can indicate a low impedance fault such as a direct short circuit whereas a low intensity arc may indicate a normal overload condition In some embodiments, the controller 290 can identify and provide as output to a user a likely transition event type from a plurality of potential transition events types.

Although the controller 290 is illustrated with respect to a plurality of sensors 210, it should be understood that the controller 290 can be operatively connected to a single sensor while still providing operations such as identifying a transition event from a plurality of types of transition events in a overcurrent protection component responsive to detection by one (or more of) the sensor(s) 210.

As further illustrated in FIG. 6, the transmitter 295 can be used to transmit an indication of the operation of an overcurrent protection component (e.g., whether the switch circuit 260 is in an active or inactive state) to a remote device such as a remote monitoring station.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An operation detection device for an overcurrent protection component, the overcurrent protection component having a closed state and an open state and outputting a transition event responsive to a transition between the closed state and the open state, the device comprising:

a housing configured to attach to the overcurrent protection component;

a sensor positioned in the housing at a location selected to allow the sensor to detect the transition event; and a switch circuit operatively coupled to the sensor that is configured to generate an output signal indicating a change in state of the overcurrent protection component responsive to detection of the transition event by the sensor.

2. The operation detection device of claim 1, wherein the sensor is electrically isolated from the overcurrent protection component.

3. The operation detection device of claim 1, wherein the transition event comprises one of a plurality of transition events having different associated types, and the switch circuit is further configured to identify ones of the associated types of transition events responsive to detection by the sensor.

4. The operation detection device of claim 3, wherein the types of transition events comprises a short circuit transition event and/or an overload transition event.

5. The operation detection device of claim 3, wherein the sensor comprises a plurality of sensors, and wherein the plurality of sensors include optical sensors, thermal sensors and/or acoustic sensors.

6. The operation detection device of claim 1, wherein the transition event comprises a light burst emitted by the overcurrent protection component when the overcurrent protection component transitions from the closed state to the open state and wherein the sensor comprises a photosensor.

7. The operation detection device of claim 6, wherein the sensor is configured to detect the transition event responsive to the light burst when the light burst has a duration of less than about 500 milliseconds.

8. The operation detection device of claim 1, wherein the transition event comprises radiofrequency (RF) energy produced by an arc from the overcurrent protection component upon transition of the overcurrent protection component from the closed state to the open state and wherein the sensor comprises an RF detector.

9. The operation detection device of claim 1, wherein the transition event comprises infrared (IR) radiation produced by heat of an arc from the overcurrent protection component upon transition of the overcurrent protection component from the closed state to the open state and wherein the sensor comprises an IR detector.

10. The operation detection device of claim 1, wherein the transition event comprises an acoustic impulse produced when the overcurrent protection component upon transition of the overcurrent protection component from the closed state to the open state and wherein the sensor comprises an acoustic sensor.

11. The operation detection device of claim 1, wherein the switch circuit further comprises a transmitter configured to transmit the output signal indicating a change in state of the overcurrent protection component to provide a remote notification of detection of the transition event.

12. The operation detection device of claim 1, further comprising a light emitting device (LED) coupled to the housing and wherein the switch circuit is configured to illuminate the LED responsive to detection of the transition event by the sensor to provide a local notification of detection of the transition event.

13. An overcurrent protection assembly comprising the overcurrent protection component and the operation detection device according to claim 1.

14. An operation detection device for a overcurrent protection component, the overcurrent protection component having a closed state and an open state and outputting a transition event responsive to a transition between the closed state and the open state, the device comprising:

- a sensor electrically isolated from the overcurrent protection component and positioned in a location selected to allow the sensor to detect the transition event; and
- a switch circuit operatively coupled to the sensor that is configured to generate an output signal indicating a change in state of the overcurrent protection component responsive to detection of the transition event by the sensor.

15. The operation detection device of claim 14, further comprising a housing configured to detachably mount the sensor to a overcurrent protection component and to position the sensor at the location selected to allow the sensor to detect the transition event.

16. The operation detection device of claim 14, wherein the location of the sensor is displaced from the overcurrent protection component.

17. The operation detection device of claim 14, wherein the transition event comprises one of a plurality of transition events having different associated types, and the switch circuit is further configured to identify ones of the associated types of transition events responsive to detection by the sensor.

18. The operation detection device of claim 17, wherein the types of transition events comprises a short circuit transition event and/or an overload transition event.

19. The operation detection device of claim 17, wherein the sensor comprises a plurality of sensors, and wherein the plurality of sensors include optical sensors, thermal sensors and/or acoustic sensors.

20. The operation detection device of claim 14, wherein the transition event comprises a light burst emitted by the overcurrent protection component when the overcurrent protection component transitions from the closed state to the open state and wherein the sensor comprises a photosensor.

21. The operation detection device of claim 20, wherein the sensor is configured to detect the transition event responsive to the light burst when the light burst has a duration of less than about 500 milliseconds.

22. The operation detection device of claim 14, wherein the transition event comprises radiofrequency (RF) energy produced by an arc during the transition of the overcurrent protection component from the closed state to the open state and wherein the sensor comprises an RF detector.

23. The operation detection device of claim 14, wherein the transition event comprises infrared (IR) radiation produced by heat of an arc during the transition of the overcurrent protection component from the closed state to the open state and wherein the sensor comprises IR detector.

24. The operation detection device of claim 14, wherein the transition event comprises an acoustic impulse produced during the transition of the overcurrent protection component from the closed state to the open state and wherein the sensor comprises an acoustic detector.

25. The operation detection device of claim 14, wherein the switch circuit further comprises a transmitter configured to transmit the output signal indicating a change in state of the overcurrent protection component to provide a remote notification of detection of the transition event.

26. The operation detection device of claim 14, further comprising a light emitting device (LED) coupled to the housing and wherein the switch circuit is configured to illuminate the LED responsive to detection of the transition event by the sensor to provide a local notification of detection of the transition event.

27. An overcurrent protection assembly comprising the overcurrent protection component and the operation detection device according to claim 14.

28. A method of detecting an operation of an overcurrent protection component, the overcurrent protection component having a closed state and an open state and outputting a transition event responsive to a transition between the closed state and the open state, the method comprising:

- detecting the transition event using a sensor that is electrically isolated from the overcurrent protection component; and
- generating an output signal indicating a change in state of the overcurrent protection component responsive to detection of the transition event by the sensor.

* * * * *